W. WILSON & L. WEIGERT-STERNE.
WATER CLOSET AND APPARATUS FOR FLUSHING THE SAME.
APPLICATION FILED SEPT. 9, 1908.
921,047.
Patented May 11, 1909.
5 SHEETS—SHEET 2.
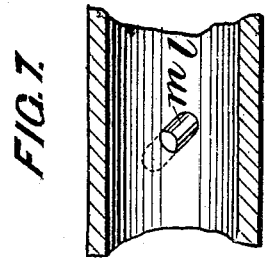
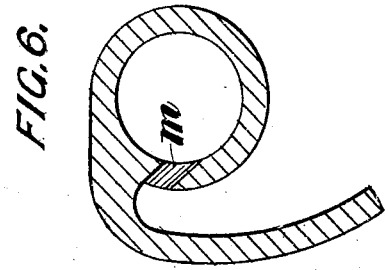
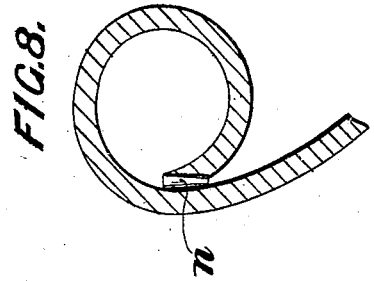
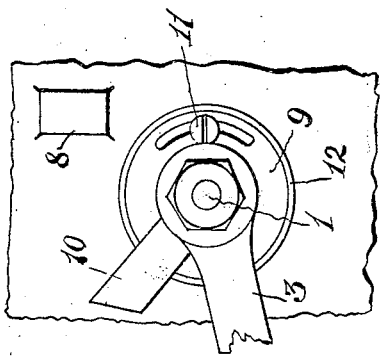
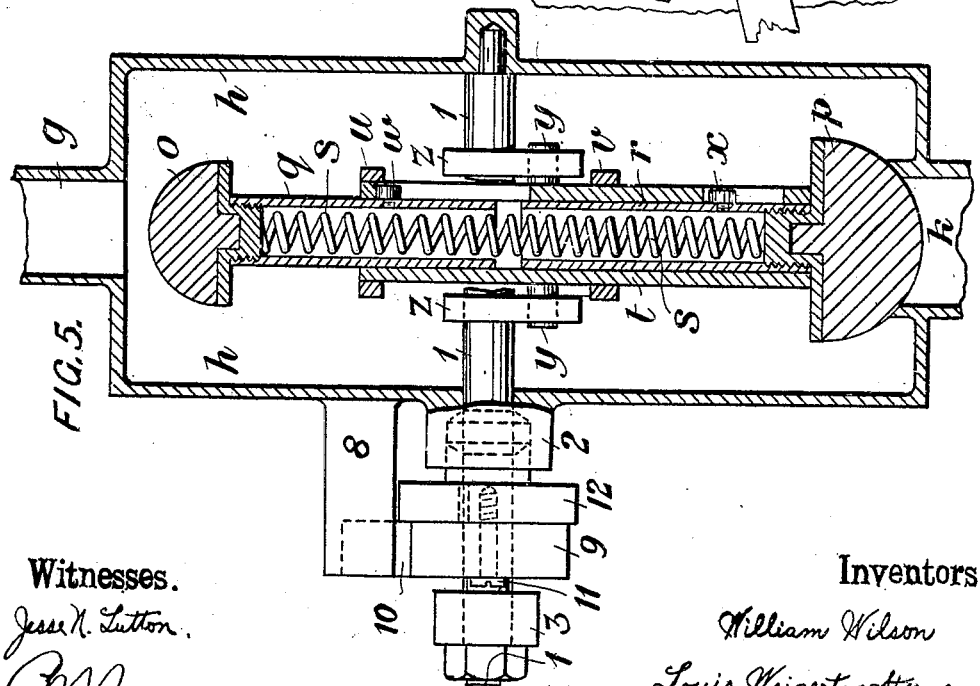
Witnesses.
Inventors.

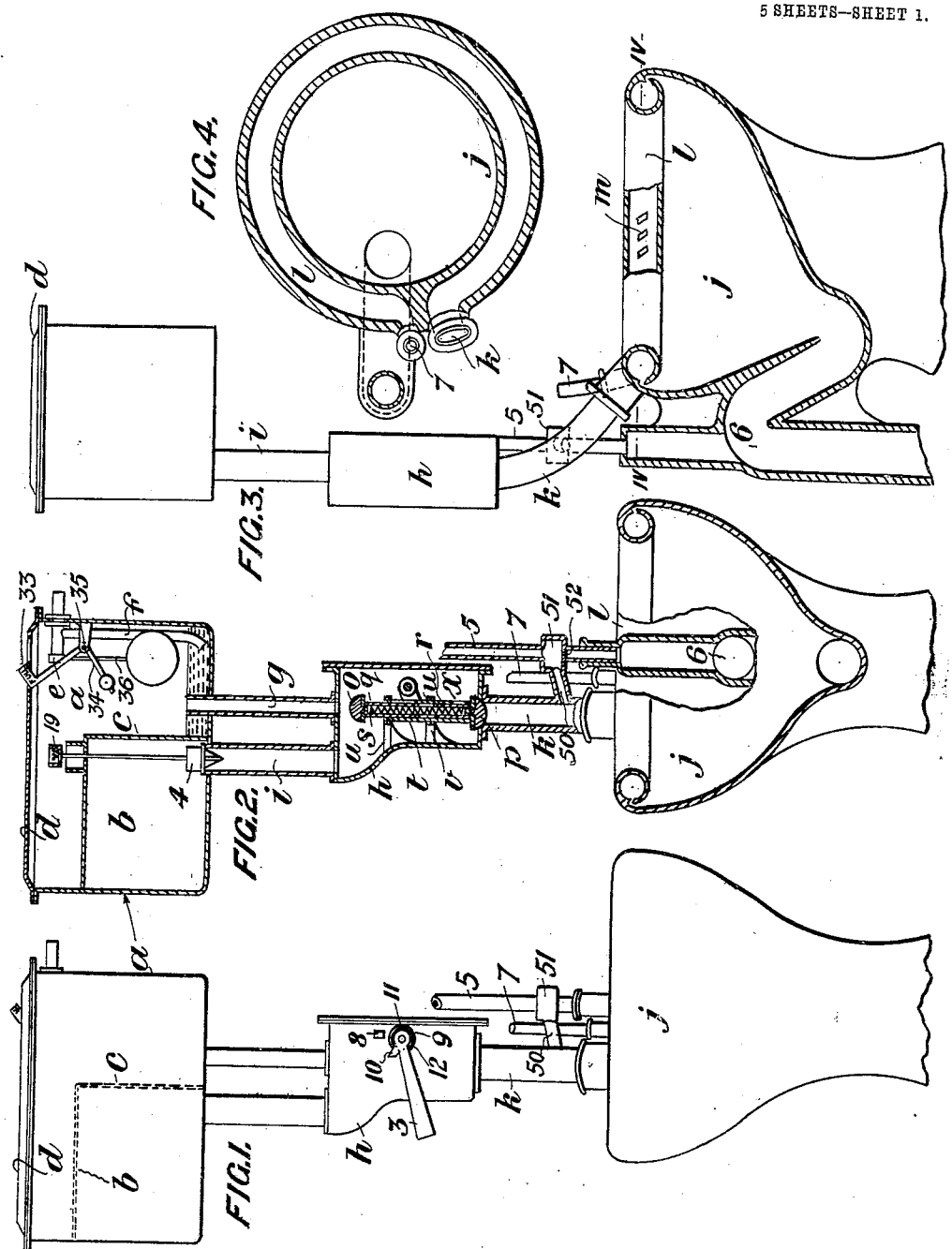

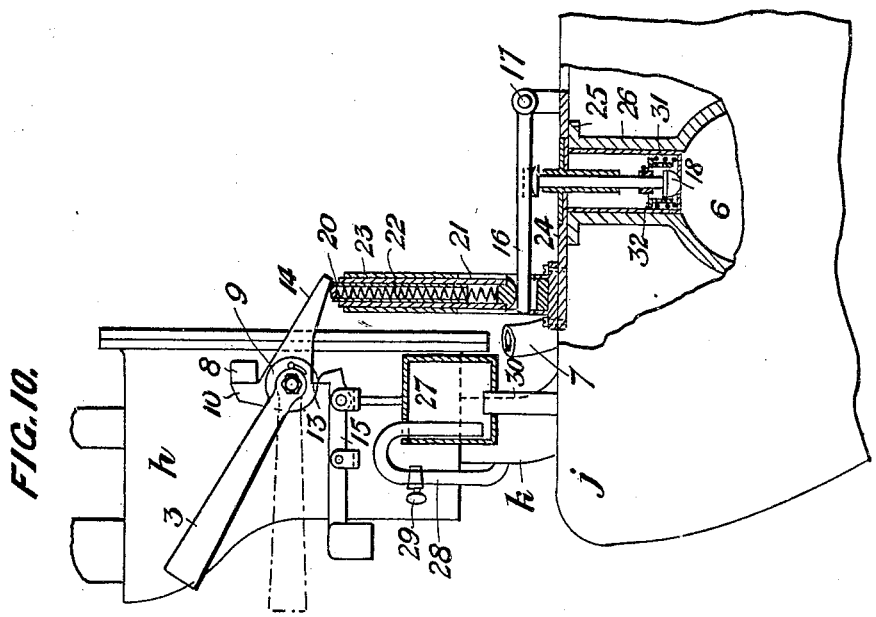
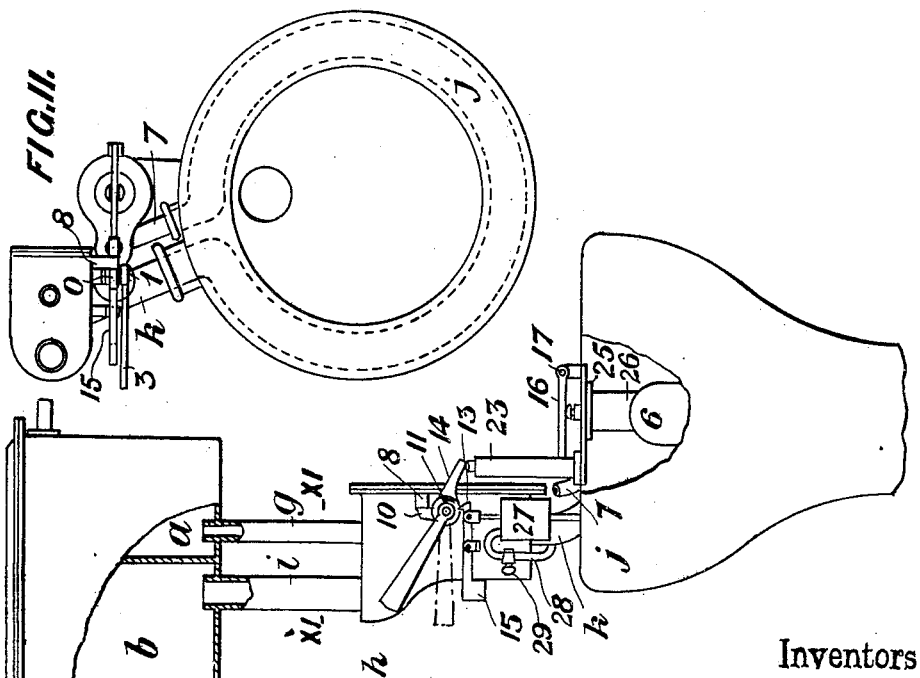

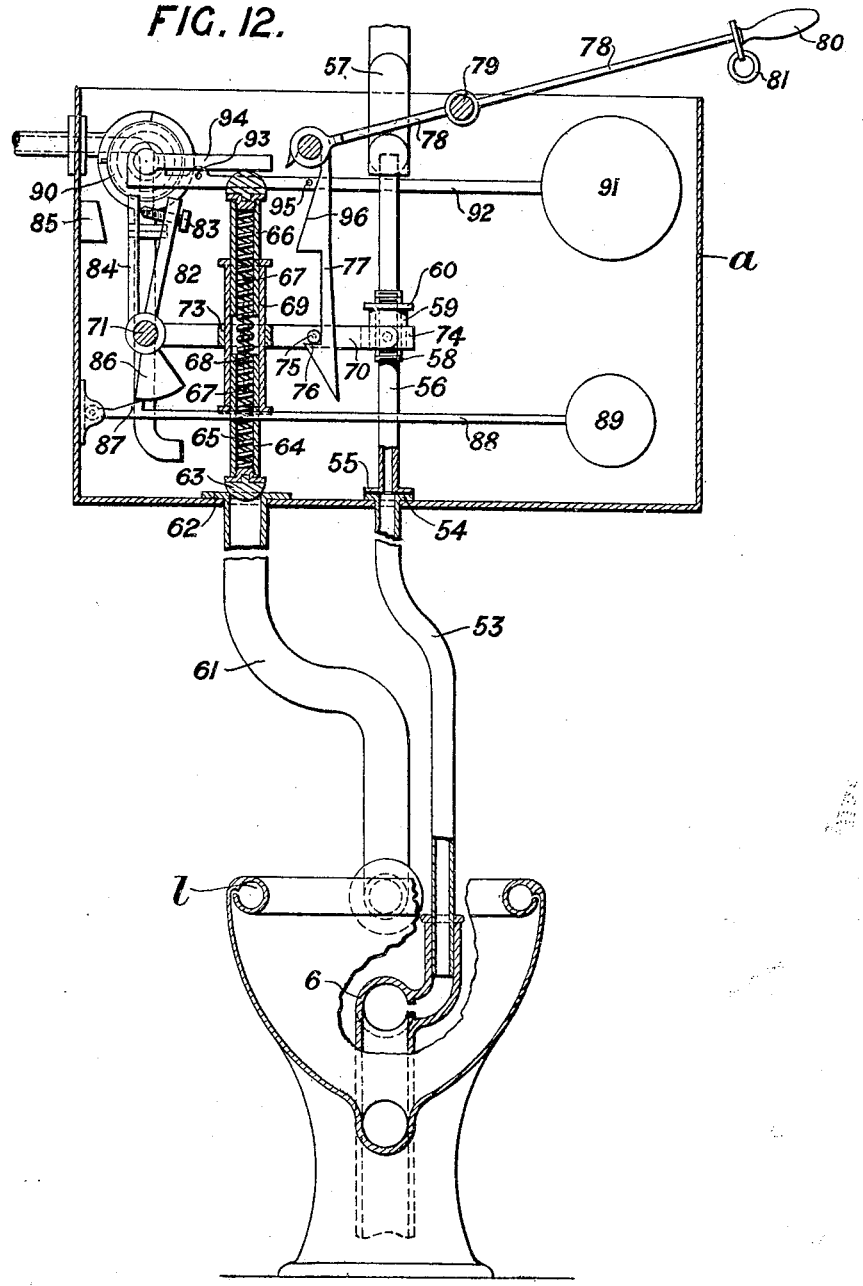

W. WILSON & L. WEIGERT-STERNE.
WATER CLOSET AND APPARATUS FOR FLUSHING THE SAME.
APPLICATION FILED SEPT. 9, 1908.
921,047.
Patented May 11, 1909.
5 SHEETS—SHEET 5.
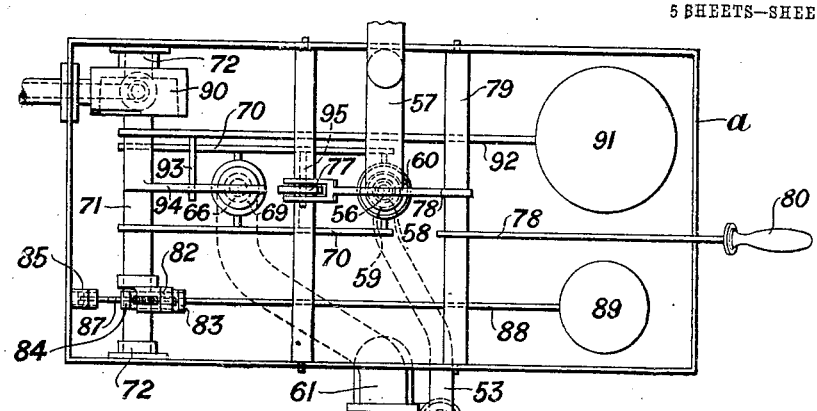
FIG. 13.
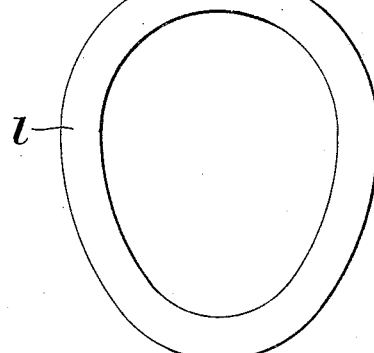
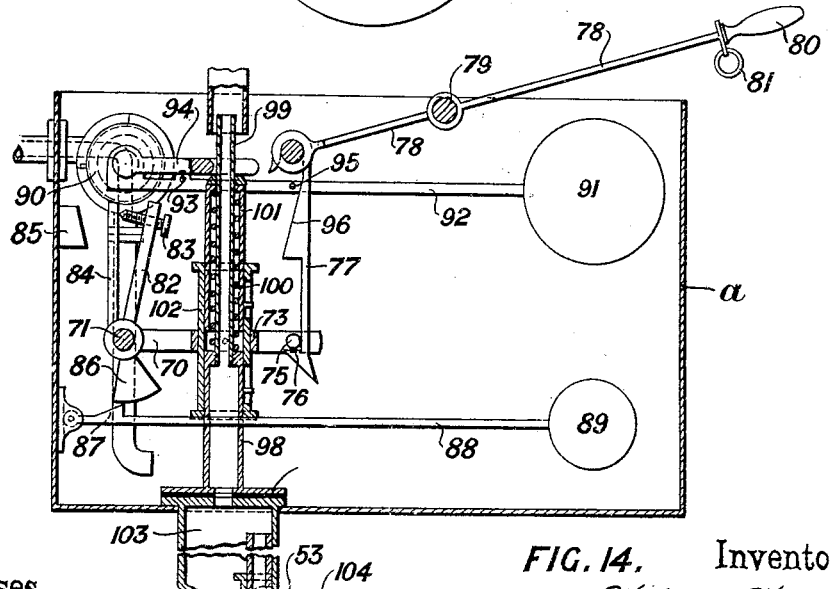
FIG. 14.
Witnesses.
Jesse N. Sutton.
Inventors.
William Wilson
Louis Weigert-Sterne
by Henry Orth Jr.
atty.

UNITED STATES PATENT OFFICE.

WILLIAM WILSON AND LOUIS WEIGERT-STERNE, OF KENTISH TOWN, ENGLAND.

WATER-CLOSET AND APPARATUS FOR FLUSHING THE SAME.

No. 921,047.  Specification of Letters Patent.  Patented May 11, 1909.

Application filed September 9, 1908. Serial No. 452,290.

*To all whom it may concern:*

Be it known that we, WILLIAM WILSON, scientific-instrument maker, a subject of the King of Great Britain, and LOUIS WEIGERT-STERNE, physician, a citizen of the United States of America, both residing at No. 1 Belmont street, Kentish Town, in the county of Middlesex, England, have invented a new and useful Improvement in Water-Closets and Apparatus for Flushing the Same, of which the following is a specification.

This invention relates to improvements in water closets and in apparatus for flushing the same, and of the type in which the water is delivered into the pan or basin in such manner as to cause a whirlpool during the siphonic action the object of the several improvements being to construct a closet which shall be quite silent and extremely efficient in action.

This invention consists principally in combining means for mechanically regulating the speed of the flush so as to govern dimensions and intensity of the whirlpool, with means for automatically stopping the flush at a given instant.

The invention further comprises a novel construction of valve for use in this connection and means for permitting of the free escape of air from the scroll or the like as it is displaced by the flushing water.

Figure 1 of the accompanying drawings is an elevation of a water closet constructed according to this invention. Fig. 2 is principally a central vertical section of Fig. 1 but with parts in elevation and with the pan also in section and broken away to show the siphon. Fig. 3 is a sectional side elevation. Fig. 4 is a plan section on the line IV—IV Fig. 3, and although the pan is shown circular in shape it is evident that it may be more or less oval or of other usual shape if desired. Fig. 5 is a sectional view to a larger scale so as to show the valve casing and the valves contained therein in section. Fig. 5ª is a detail front elevation of an adjustment. Figs. 6 and 7 are detail sectional views showing the openings for the discharge of the water into the pan. Fig. 8 is a sectional view of a modified form of scroll. Fig. 9 is a front view partly in elevation and partly in section of a modified form of the apparatus. Fig. 10 is a sectional elevation of part of this apparatus to a larger scale. Fig. 11 is a sectional plan on the line XI—XI Fig. 9. Fig. 12 is a sectional view similar to Fig. 2 of a further modification. Fig. 13 is a plan of Fig. 12 and Fig. 14 is a view of certain modified parts which may be substituted for the corresponding parts in Fig. 12.

Referring more particularly to Figs. 1, 2, 3, 4 and 5, the filling tank $a$ and the flushing tank $b$ are shown made in one being practically divided by a partition $c$ and if desired the tank has a cover or top $d$. The filling tank has a ball cock $e$ with a long supply pipe $f$ reaching nearly to the bottom of the tank and with a lateral opening or bend so as to be as noiseless as possible. The upper end of the outlet pipe $g$ is raised some distance above the bottom of the tank $a$ so that the discharge orifice of the pipe $f$ is always covered with water. The flag 33 to indicate the level of the water in the tank $a$ is mounted on a weighted double armed lever 34 pivoted at 35 and is adapted to be raised by the lever 36 of the ball cock $e$ which strikes the arm 34 in rising. The bottom of the outlet pipe $g$ from the tank $a$ is connected to a valve casing $h$ which is also connected by a pipe $i$ to the flushing tank or cistern $b$ and by another pipe $k$ to the pan or basin $j$ and preferably to a so-called scroll $l$ which is a circular or nearly circular tube around the top of the pan having openings $m$ Fig. 3 (see also Figs. 6 and 7) to permit the discharge of water into the pan to flush the same, these openings being more or less pointing upward and slanting or tangential to cause the water to travel from the point of issue in close contact with the interior of the pan and in a more or less spiral direction.

Fig. 8 illustrates a scroll in which the water passes downward through holes $n$ from the first instead of upward and then downward as in the previous example. The said valve casing $h$ Figs. 1, 2, 3 and 5, is provided with a double valve or as best shown in Fig. 5 with two valves $o$ and $p$ of which the valve $o$ is adapted to close the pipe $g$ from the filling tank $a$ and the valve $p$ the opening or valve seat on the pipe or conduit $k$ connecting the valve casing $h$ with the pan $j$.

The aforesaid valves are so constructed that they may close both the pipes $g$ and $k$ simultaneously or one or the other but so that it is impossible for both valves to be open at the same time. A convenient way for constructing the said valves is to mount them on hollow pistons $q$ and $r$ respectively actuated by a spring $s$ within a hollow cylinder $t$ adapted to slide in guides $u$ and $v$ fixed in the valve casing $h$, the pistons having stops $w$ and $x$ or the like to limit their motion within the hollow cylinder $t$ and the latter being operated for example by providing it with trunnions $y$ $y$ on to which take two forked levers $z$ $z$ fixed on a spindle 1 which is mounted at one end in a recess in the side of the casing $h$ while the other end passes through a stuffing box 2 or the like in the casing $h$ and is furnished outside thereof with a handle 3. By turning the handle 3 so as to raise the tube $t$ from the position shown in Fig. 5, the spring $s$ presses upward the valve $o$ so that the stop $w$ follows the movement of the tube $t$ until the valve $o$ is seated, after which the upper slot will move over the stop $w$ and then the lower end of the lower slot strikes the stop $x$ and raises the valve $p$ against the action of the spring $s$. Upon reverse movement of the handle 3 the valve $p$ will first close under action of the spring $s$ and valve $o$ will not open until the upper end of the upper slot strikes stop $w$. Thus it is seen that in one position of the handle 3 both valves are closed at the same time. The upper slot is preferably made longer than the lower slot so that after the stop $x$ has been struck by the lower end of the lower slot the tube $t$ may continue to rise so as to considerably raise the valve $p$. In the normal position of the said handle the valve $o$ is open as shown and as the filling tank $a$ fills, water also passes into the valve casing $h$ and from thence to the flushing tank $b$ by the pipe $i$ until the level in both tanks is high enough to cause the ball valve $e$ in the filling tank to close.

The flushing tank $b$ is provided with a float valve 4 adapted to close the orifice of the pipe $i$ before all the water escapes from the said tank during the flushing operation, thus preventing passage of air down the pipe $i$. During discharge from $i$ the water owing to the head has passed through the connection 50 into the chamber 51 and up the pipe 5, some escaping through the orifice 52 to the siphon 6. Thus during discharge the air vent through the pipe 5 to the siphon 6 is sealed and after the closing of the valve 4 this water has time to escape from the air escape pipe 5 and the latter then admits air to the siphon just before the siphonic action ceases and thus prevents that sucking or gurgling noise which usually occurs when the siphonic action stops and air passes through the water in the pan to the siphon to occupy the space which has been just previously filled with water. It will be noticed that the small hole 52 in the bottom of said chamber 51 prevents the water passing rapidly away down to the siphon while the discharge is taking place but is large enough to allow air to pass freely to the siphon as soon as the said chamber 51 is empty of water. The float valve 4 is suitably provided with a cup 19 to hold shot or other weights to permit of regulating the closure of the valve 4.

In order that the air which is in the scroll shall not mingle and be carried along with the flushing water into the pan, the said scroll is also suitably connected to an air pipe 7 as shown in Figs. 1, 2, 3 and 4.

In order to regulate the amount of movement of the discharge valve, it is suitably provided with an adjustable stop so as to permit of regulating the amount of opening and consequently the volume of water passing down the discharge pipe per unit of time so as to regulate the intensity of the whirlpool. For this purpose the valve casing $h$ is conveniently provided with an arm or lug 8 (Figs. 1 and 5) rigidly attached thereto and a stop such as a disk 9 with an arm 10 is mounted on the spindle 1 being held thereon by means of screws 11 passing through curved slots in the disk 9 and screwing into a disk 12, fixed or keyed to the said spindle 1. The arm 10 of the disk 9 comes into contact with the stop 8 when it is raised and so limits the movement of the handle lever and the amount of lift of the valve $p$ is regulated. It is however evident that this part of the invention may be carried out in many other ways.

The construction shown in Figs. 9, 10 and 11 is very similar to the just described construction except that the valve 4 in the tank $b$ is dispensed with and the closure of the valve $p$ is automatically regulated by means which can be adjusted externally to a nicety. As in the previous construction the tank $a$ Fig. 9 is connected to the valve casing $h$ by the pipe $g$ and the tank $b$ is connected to the valve casing $h$ by the pipe $i$. The spindle 1 of the handle lever 3 is also provided with an adjustable disk 9 having an arm 10 adapted to come into contact with a fixed stop 8 on the valve casing $h$. The said disk 9 also has a projection 13 and a lever 14. When the handle lever 3 is pushed upward, the projection 13 rides over and is finally retained by the hooked end of a weighted lever 15, the pivot or fulcrum of which is fixed to the casing $h$. The lever 14 depresses a rod which presses elastically on a lever 16 fulcrumed at 17 and adapted to close a valve 18 (Fig. 10) which valve closes a valve seating in the arch 6 of the siphon. The aforesaid rod is conveniently made of two hollow cylindrical parts 20 and 21, both of which are closed at their ends, fit loosely and telescopically together and have a spring 22 therein which tends to keep their closed ends apart from each other. The outer hollow rod part 21 slides in a cylindrical guide 23 which is slotted to allow the lever 16 to be guided in said slot and to move freely therein.

The fulcrum 17 of the lever 16 and the guide 23 are suitably mounted as shown on a plate 24 fixed to the flange 25 on the top of the extension 26 of the arch of the siphon 6. In order to release the weighted handle 3 to allow it to close the discharge valve in the casing $h$ at the proper moment and to admit air to the arch of the siphon, the light end of the lever 15 is provided with a receptacle 27 hanging thereto and the discharge pipe $k$ has connected thereto a small pipe 28 bent around so as to nearly reach the bottom of the said receptacle 27 and having a cock 29 to regulate the amount of water passing into the receptacle 27 per unit of time while the discharge of water into the pan $j$ is taking place. When the receptacle 27 is sufficiently filled with water to overcome the weight of the other end of the lever 15 and the friction between the hooked end of said lever and the projection 13 on the disk 9, the lever drops and releases the projection 13, the handle lever 3 then drops back by its own weight to a more or less horizontal position and closes the discharge valve to the pipe $k$. This also cuts off the supply to the receptacle 27 which comparatively slowly empties itself of water by its waste pipe 30 down to the level of the top of its said waste pipe. The said waste pipe 30 serves to conduct the water away back into the flushing pipe or elsewhere as found convenient. When the handle resumed its normal position, the lever 14 also released the telescopic push rods 20 and 21 and the valve 18 was then raised by a spring 31 surrounding a hollow perforated cylindrical guide 32 fixed to the stem of the said valve 18, and admitted air to the siphon prior to the ceasing of the siphonic discharge as in the construction first described.

According to the modification seen in Figs. 12 and 13 an air vent pipe 53 is taken up to the tank $a$ from the siphon bend 6 and is joined to a seat 54 upon which is seated an annular valve 55 with a hollow upstanding stem 56 whose upper end is open to the air and may be received in the lower end of a hood or uptake 57 for conducting away any objectionable fumes which may enter the pipe 53 from the bend 6. Upon the stem 56 is a screw threaded enlargement or sleeve 58 over which is screwed a nut 59 having an abutment flange 60. The water discharge pipe 61 connects between a seat 62 in the tank $a$ and the scroll $l$ and a valve 63 normally rests upon the seat 62 and closes the communication between the tank and pipe 61. The valve 63 has a hollow stem 64 containing a spring 65 whose other end presses upward a hollow plunger 66, the action of the spring being limited by pins or stops 67 on the hollow parts 64, 66, taking against the ends of a slot 68 in a sleeve 69 surrounding the said parts 64, 66. The valves 55 and 63 are lifted by a lever 70 on a rock shaft or pivot 71 turning in suitable bearings 72 in the tank $a$, the lever 70 conveniently consisting of two parallel members as seen in Fig. 13. Between these members are pivotally supported a ring 73 suitably connected with the sleeve 69 and a ring 74 of such a diameter as to take around the nut 59 but to abut against the flange 60 when the lever is raised. The lever 70 has a pin supporting an antifriction roller 75 with which engages a tooth or projection 76 on the hook member 77 suspended from the end of a double arm lever 78 pivoted at 79 whose other end is provided with a handle 80, or chain connection 81. A short arm 82 is fixed to the shaft 71 and a set screw 83 in the end of the arm 82 bears against the arm 84 loosely mounted on the shaft and when the lever 70 is raised pushes the arm 84 against a stop 85 on the tank. By projecting the screw 83 more or less from the arm 82 the amount of lift of the valve 63 is varied. The segment shaped arm 86 is fixed to the shaft 71 in such a position that when the lever 70 is raised, a tooth or projection 87 on the pivoted arm 88 of a float 89 is free to be moved by the float 89 into the return path of the arm 86 and to prevent the return thereof so maintaining the valves 63 and 55 open until released by the falling of the float 89. The ball operated cock 90 may be of the rotary plug variety and is closed by the float 91 whose arm 92 carries a pin 93 which strikes against a weighted arm 94, which arm otherwise maintains the plug open. The arm 94 lies moreover in the path of the plunger 66 by which it is maintained in the closed position during the discharge. A pin 95 on the arm 92 is adapted to contact with the inclined edge 96 of the member 77 when the ball float 91 descends and to push back the member 77 so as to release the tooth 76 from the roller 75 to permit the lever 70 to fall again and close the valves when released by the tooth 87 owing to the falling of the ball or float 89.

The operation of this construction is as follows:—When the handle 80 is pulled down both valves 55, 63 are opened as aforesaid and the cock 90 is maintained closed by the engagement of the plunger 66 with the arm 94. Also the tooth 87 will have locked the arm 86 to maintain this position of the parts. Water now passes down both pipes 61 and 53 until the level in the tank is such that the ball 89 falls and releases the tooth 87 after which both valves will close, whereupon air is admitted through the stem 56 to the pipe 53 and bend 6, the air reaching the last named to break the siphonic action. The amount of opening of the valve 63 is regulated by the screw 83 and the moment of opening and closing of the valve 55 by the adjustment of the sleeve 59, so that as with the preceding constructions the whirl of water is controllable, as is also the timing of the air admission to the bend 6.

In the construction seen in Fig. 14 only a single valve 97 is used being annular and with a hollow stem 98, the upper reduced end 99 of which is open to the air preferably through a hood. On the shoulder at the junction of the parts 98 and 99 is seated a spring 100 which presses apart the hollow plunger 101 and the valve stem 98 their movement being limited by pins taking into slots in the sleeve 102 similar to the sleeve 69 in the previous construction. The discharge pipe 61 is enlarged into a chamber 103 at its upper end and the air pipe 53 passes thereinto at one side. The remaining parts of this apparatus are similar to those in Figs. 12 and 13. When the valve 97 is open water passes down both pipes 53 and 61 and after the valve 97 has closed air is at once admitted down the hollow stem 99, 98 to the pipe 53 and will reach the bend 6 in time to break the siphonic action as required. A cock 104 or the like is provided for regulating the flow of water through the pipe 53, for the purpose of adjusting the timing of the air admission.

What we claim and desire to secure by Letters Patent of the United States is:—

1. Flushing apparatus for water closets comprising in combination a pan, a siphon discharge leading therefrom, a water tank, a water whirl delivery to said pan, a valve controlling the supply of water from said tank to said whirl delivery, means for operating said valve, means for adjusting the extent of opening of said valve, an air admission to said siphon, and automatic means controlling the timing of said admission substantially as set forth.

2. Flushing apparatus for water closets comprising in combination a pan, a siphon discharge leading therefrom, a water tank, a water whirl delivery to said pan, a valve controlling the supply of water from said tank to said whirl delivery, means for operating said valve, means for adjusting the extent of opening of said valve, an air admission to said siphon, a valve, and automatic means operating in such a manner as to time the said admission of air substantially as set forth.

3. Flushing apparatus for water closets comprising in combination a pan, a siphon discharge leading therefrom, a water tank, a water whirl delivery to said pan, a valve controlling the supply of water from said tank to said whirl delivery, means for operating said valve, means for adjusting the extent of opening of said valve, a pipe leading from said siphon and normally open to the outer air, means for closing said pipe to the air and opening it to the water discharge and for subsequently closing said pipe to the water discharge and opening it to admit air to the siphon at the timed instant substantially as set forth.

4. Flushing apparatus for water closets comprising in combination a pan, a siphon discharge leading therefrom, a water tank, a water whirl delivery to said pan, a valve controlling the supply of water from said tank to said whirl delivery, means for operating said valve, means for adjusting the extent of opening of said valve, an air admission to said siphon, means under control of said valve operating means operating to water-seal said air admission during siphonic discharge and to destroy said seal just before the siphonic action is to cease, substantially as set forth.

5. Flushing apparatus for water closets comprising in combination a pan, a siphon discharge leading therefrom, a water tank, a water whirl delivery to said pan, a valve controlling the supply of water from said tank to said whirl delivery, means for operating said valve, means for adjusting the extent of opening of said valve, an air admission to said siphon, means controlled by said valve operating means for controlling said admission to open same in advance of the stoppage of siphonic action, and an adjustment for timing the opening of said air admission substantially as set forth.

6. Flushing apparatus for water closets comprising in combination a pan, a siphon discharge leading therefrom, a water tank, a water whirl delivery to said pan, a valve controlling the supply of water to said whirl delivery, a lever for operating said valve, a stop, an abutment adjustably connected with said lever and adapted to contact with said stop, an air admission to said siphon and automatic means controlling the timing of said admission substantially as set forth.

7. Flushing apparatus for water closets comprising in combination a pan, a siphon discharge leading therefrom, a water tank, a water whirl delivery to said pan, a valve controlling the supply of water from said tank to said whirl delivery, means for opening and closing said valve, means for adjusting the extent of the opening of said valve, an air admission to said siphon, and means under control of said means for operating said valve for closing said air admission when said valve is opened and for opening said air admission when the siphonic action is to cease, substantially as set forth.

8. Flushing apparatus for water closets comprising in combination a pan, a siphon discharge leading therefrom, a water tank, a water whirl delivery to said pan, a valve controlling the supply of water from said tank to said whirl delivery, means for opening and closing said valve, means for adjusting the extent of the opening of said valve, an air admission to said siphon, means under control of said means for operating said valve for closing said air admission when said valve is opened and for opening said air admission when the siphonic action is to cease, a water supply to said tank, a cock for opening and closing said supply, and means under control of said means for operating said valve, for maintaining said cock closed during the discharge substantially as set forth.

9. Flushing apparatus for water closets comprising in combination a pan, a siphon discharge leading therefrom, a water tank, a water whirl delivery to said pan, manually controlled means for opening communication between said tank and said water whirl delivery, and automatic means for closing said communication after a predetermined interval, means for adjusting the rate of flow from said tank to regulate said water whirl delivery to said pan, an air admission to said siphon and automatic means controlling said admission to open same when the siphonic action is to cease, substantially as set forth.

In testimony whereof we have signed our names to this specification in the presence of two subscribing witnesses.

WILLIAM WILSON.
LOUIS WEIGERT-STERNE.

Witnesses:
ALFRED NUTTING,
PERCY PHILLIPPS.